United States Patent [19]

Uenohara

[11] Patent Number: 4,709,796
[45] Date of Patent: Dec. 1, 1987

[54] TORSION RUBBER TYPE DAMPER DISC

[75] Inventor: Norihisa Uenohara, Moriguchi, Japan

[73] Assignee: Kabushiki Kaisha Daikin Seisakusho, Osaka, Japan

[21] Appl. No.: 785,435

[22] Filed: Oct. 8, 1985

[30] Foreign Application Priority Data

Oct. 15, 1984 [JP] Japan .......................... 59-155636[U]

[51] Int. Cl.[4] .............................................. F16D 3/14
[52] U.S. Cl. .............................. 192/106.1; 192/70.17; 464/68
[58] Field of Search ............... 192/106.1, 106.2, 70.17; 464/85, 68; 403/223, 221

[56] References Cited

U.S. PATENT DOCUMENTS

| | | | |
|---|---|---|---|
| 2,533,789 | 12/1950 | Goodchild | 192/106.1 |
| 2,969,656 | 6/1961 | Reuter | 403/223 |
| 3,809,198 | 5/1974 | Mori | 464/85 X |
| 3,811,545 | 5/1974 | Sato et al. | 192/106.1 |
| 4,156,481 | 5/1979 | Ishida et al. | 192/106.1 |
| 4,474,276 | 10/1984 | Loizeau | 192/106.1 |
| 4,547,176 | 10/1985 | Loizeau | 192/106.1 |
| 4,549,642 | 10/1985 | Loizeau | 192/106.1 |

Primary Examiner—Andrew V. Kundrat
Assistant Examiner—Joseph A. Fischetti
Attorney, Agent, or Firm—Armstrong, Nikaido, Marmelstein & Kubovcik

[57] ABSTRACT

A torsion rubber type damper disc wherein either or both of claws of seats for a torsion rubber, which connects a flange and side plates in the circumferential direction, are bent toward a side apart from the torsion rubber so as to avoid an interference between the torsion rubber and the claws, thus a durability of the disc being improved.

5 Claims, 3 Drawing Figures

TORSION RUBBER TYPE DAMPER DISC

FIELD OF THE INVENTION

This invention relates a torsion rubber type damper disc which is of a type using a torsion rubber as a torsion spring and is suitable mainly for a clutch disc for a vehicle such as an automobile.

DESCRIPTION OF THE PRIOR ART

A construction is known, in which a torsion rubber is installed in holes made on an annular flange at hub outer periphery and side plates with torsion rubber seats disposed on both sides thereof. In this construction, a torsional vibration absorbing ability can be improved owing to an internal friction of torsion rubber itself by using the torsion rubber in place of a coil spring.

In a conventional torsion rubber type damper disc, a construction is employed, in which claws are provided on both disc inner and outer peripheral parts of the torsion rubber seat, the both claws are interposed between side plates to utilize them as a stopper for the torsion rubber, thus preventing the torsion rubber from slipping off. However, since in this construction the torsion rubber is subjected to a centrifugal force originated from a rotation of the disc to be urged toward an outer peripheral side, the claw at the disc outer peripheral side interferes with the hole of the flange and is likely to break in an earlier stage.

Especially in the conventional construction, the claws are bent in such a manner as to cover the torsion rubber, so that the claws are likely to cut into the hole of the flange. In order to prevent a tip of the claw from interfering with the flange, a construction wherein the claw is bent strongly toward the torsion rubber side can be conceived. However, since in this construction a diameter of the torsion rubber becomes large when the torsion rubber is compressed, the claw interferes with the torsion rubber to incur a possibility of cracks on the torsion rubber.

SUMMARY OF THE INVENTION (Problem to be resolved by this invention)

The above conventional construction includes a problem that the flange interferes with the torsion rubber seat to cause the early breakage of the claw for torsion rubber seat.

Further, in such a construction that the claw is strongly bent toward the torsion rubber side for the purpose of preventing the early breakage of claw, it includes a problem that the claw cuts into the torsion rubber to cause cracks on the torsion rubber.

An object of this invention is to resolve the above-mentioned problem.

(Measure to resolve the problem)

A torsion rubber type damper disc, in which a flange is formed on an outer periphery of a hub, freely rotatable side plates are disposed on both sides of the flange, holes are formed on the flange and the side plates, the flange and the side plates are elastically interconnected with each other in a disc circumferential direction by installing a torsion rubber in the holes through torsion rubber seats, and at the same time claws are provided on both disc inner and outer peripheral sides of the torsion rubber seats and the both claws are interposed between the side plates to form a stopper for the torsion rubber; characterized by that either or both of the claws for said torsion rubber seats are bent toward sides apart from the torsion rubber to avoid an interference between the torsion rubber and the claws.

DETAILED DESCRIPTION OF THE INVENTION

Figure 2:
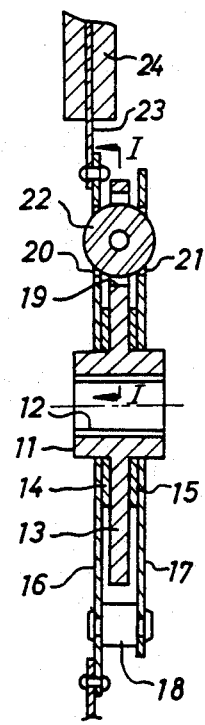
FIG. 2 is a vertical sectional partial view of a case wherein the damper disc is employed in a clutch disc.

In FIG. 2, a spline hub 11 is provided on its inner peripheral surface with a spline 12 fitting onto an output shaft, and integrally has a disc-like flange 13 on its outer peripheral surface. Annular friction members 14 & 15 are disposed on opposite inner peripheral parts of the flange 13, a pair of disc-like side plate 16 & 17 (a clutch plate and a retaining plate) are disposed on both sides of the flange 13 and holding the friction members 14 & 15.

At portions near to outer peripheries of the flange 13 and the both side plates 16 & 17, respective plural holes 19, 20 & 21 (only one is shown for each) are provided with spaces left therebetween in a circumferential direction of the clutch disc. The holes 19, 20 & 21 align each oher in a direction parallel with a center line of an output shaft (a lateral direction of FIG. 2), and a torsion rubber with a circular section is installed in each one set of holes 19, 20 & 21. Each torsion rubber extends in the disc circumferential direction and the flange 13 is elastically interconnected with the both side plates 16 & 17 through the torsion rubber 22 in the disc circumferential direction. Further, outer peripheral parts of the both side plates 16 & 17 are interconnected with each other by a stop pin 18. An inner peripheral part of a cushioning plate 23 is fixed to the outer peripheral part of one side plate 16 (clutch plate), and annular facings 24 are fastened to both faces of the cushioning plate 23 by not-shown rivets.

Figure 1:
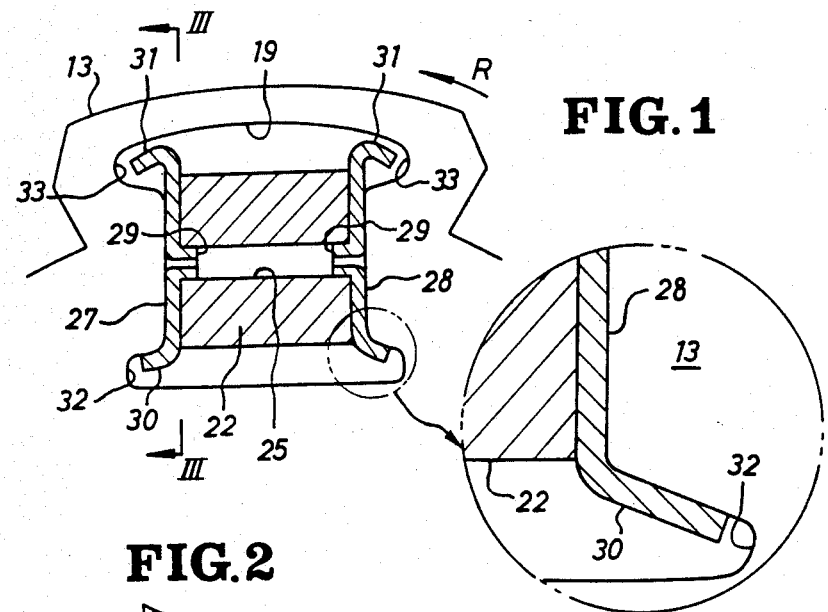
FIG. 1 is a vertical sectional partial view of a torsion rubber type damper disc according to this invention and corresponding to a sectional partial view taken on a line I—I of FIG. 2.

As shown in FIG. 1, the torsion rubber 22 is disposed in such a way that its center line is roughly directed in the disc circumferential direction, and has a hole 25 in its central part. Torsion rubber seats 27 & 28 made of sheet metal are interposed between both ends of the torsion rubber 22 and each hole 19 (20, 21). Each of torsion rubber seats 27 & 28 is a generally disc-like member and has at its center a cylindrical projection 29 fitting into the hole 25 of the torsion rubber 22, thereby the torsion rubber 22 is positioned in relation to the torsion rubber seats 27 & 28.

Figure 3:
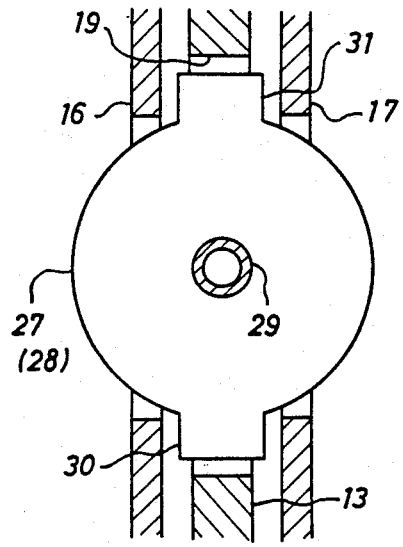
FIG. 3 is a sectional view taken on a line III—III of FIG. 1.

A disc inner peripheral side claw 30 and a disc outer peripheral side claw 31 are integrally provided at both disc inner and outer peripheral ends of the torsion rubber seats 27 & 28 respectively, the claws 30 & 31 are interposed between the side plates 16 & 17 with plays left therebetween as shown in FIG. 3, so that a stopper is realized for the torsion rubber seats 27 & 28 i.e. for the torsion rubber 22 (FIG. 1). The claws 30 & 31 are formed into a roughly rectangular shape and bent toward sides apart from the torsion rubber 22 as shown in FIG. 1. Further, recessed portions 32 & 33, in which the claws 30 & 31 come under a free state of the disc (a state of FIG. 1), are formed at both disc circumferential ends of the hole 19.

The disc inner peripheral side claws 30 of the torsion rubber seats 27 & 28 are formed in such a position that they are so inclined as to get near to the disc inner peripheral side as they get apart from the torsion rubber 22, and a disc outer peripheral side face of the recessed portion 32 is correspondingly so inclined as to get near to the disc outer peripheral side as it gets near to the torsion rubber 22 side. Further, degrees of inclination of the both are the same, and the claw 30 is lied upon the disc outer peripheral side face of the recessed portion 32 under the free state of disc. On the other hand, the claw 31 fitting in the recessed portion 33 is sharply bent toward a side apart from the torsion rubber 22, and a curved surface of the claw 31 faces on a disc outer peripheral side end face of the hole 19.

Function will be described hereunder. In FIG. 1, when a not shown pressure plate presses the facing 24 onto a flywheel of an engine, a torque is transmitted from the flywheel through the facing 24, the cushioning plate 23, the side plates 16 & 17, the torsion rubber 22, the flange 13 and the spline hub to an output shaft. Since the torsion rubber 22 is compressed correspondingly to the transmitted torque and the both side plates 16 & 17 are twisted against the flange 13 in this instance, a slippage occurs on the friction members 14 & 15. This slippage generates hysteresis torque, absorbs a torque vibration and controls abnormal vibration and abnormal sound of a power transmission mechanism. Further, since the torsion rubber 22 is used in this case, the hysteresis torque is also generated by an internal friction of the torsion rubber 22 and an absorbing effect of torque vibration can be further improved.

When, for example, the side plates 16 & 17 (FIG. 2) are twisted against the flange 13 of FIG. 1 in a direction of arrow R, the torsion rubber seat 27 is in contact with the end face of the hole 19, but the torsion rubber seat 28 is urged toward the torsion rubber seat 27 side by the side plates 16 & 17 (FIG. 2). The torsion rubber 22 is thereby compressed to become large in its diameter, but interferences between the torsion rubber 22 and the claws 30 & 31 do not occur because the claws 30 & 31 are bent in the direction opposite to the torsion rubber 22. Further, a curved surface of the claw 31 faces on the disc outer peripheral side end face of the hole 19, so that a tip end of the claw 31 never cuts into the end face of the hole 19 even if the torsion rubber 22 and the torsion rubber seat 28 are biased toward the outer peripheral side due to a centrifugal force caused by a rotation of disc. Moreover, in case when the twist of the side plates 16 & 17 (FIG. 2) is released against the flange 13, the claw 30 of the torsion rubber seat 28 fits into the recessed portion 32 having the end face with a similar degree of inclination, so that the torsion rubber seat 28 is automatically returned to the position of FIG. 1 owing to a sliding motion of the claw 30 relative to the end face of the recessed portion 32 even if the torsion rubber seat 28 is biased toward the disc outer peripheral side.

The torsion rubber seat 27 functions in the same manner as the above to prevent the claw 31 from being broken when the side plates 16 & 17 (FIG. 2) are twisted against the flange 13 in the direction opposite to the arrow R, and at the same time the torsion rubber seat 27 is automatically returned to the position of FIG. 1 when the twist is released.

(Effect of the Invention)

In the torsion rubber type damper disc, in which the flange 13 formed on the outer periphery of the hub 11, the freely rotatable side plates 16 & 17 are disposed on both sides of the flange 13, the holes 19, 20 & 21 are formed on the flange 13 and the side plates 16 & 17, the flange 13 and the side plates 16 & 17 are elastically interconnected with each other in the disc circumferential direction by installing the torsion rubber 22 in the holes 19, 20 & 21 through the torsion rubber seats 27 & 28, and at the same time the claws 30 & 31 are provided on both disc inner and outer peripheral sides of the torsion rubber seats 27 & 28 and the both claws 30 & 31 are disposed between the side plates 16 & 17 to form the stopper for the torsion rubber 22; either or both (for example, the both claws 30 & 31) of the claws 30 & 31 for said torsion rubber seats 27 & 28 are bent toward the sides apart from the torsion rubber 22 to avoid the interference between the torsion rubber 22 and the claws 30 & 31. Consequently, the following advantages become obtainable.

(a) Wear due to intereference between the flange 13 and the torsion rubber seats 27 & 28 become avoidable, and the claws 31 of the torsion rubber seats 27 & 28 can be prevented from early breakage.

(b) The torsion rubber 22 does not contact with the claws 30 & 31 of the torsion rubber seats 27 & 28 even when the torsion rubber 22 is in the compressed state, so that the breakage of the torsion rubber 22 can be avoided.

(c) Since the interference between the torsion rubber 22 and the claws 30 & 31 becomes avoidable, a width in the disc radial direction of the hole 19 of the flange 13 can be lessened and a strength of the flange 13 can be easily secured.

(Another embodiment)

(a) The claw 31 is not bent to be disposed on the same plane as the torsion rubber seats 27 & 28 and only the claw 30 is bent, so that excessive movement of the torsion rubber seats 27 & 28 toward the disc outerperipheral side may be prevented through a contact of the claw 30 with the disc outer peripheral side end face of the recessed portion 32.

(b) The disadvantage of the breakage of the claw 31 due to its cutting into the hole 19 may be avoided by only making the curved surface of the claw 31 face on the disc outer peripheral side end face without employing the construction wherein the torsion rubber seats 27 & 28 are returned to the predetermined positions by means of the claw 30 and the inclined surface of the recessed portion 32 corresponding to the claw 30.

What is claimed is:

1. A torsion rubber type damper disc, in which a flange is formed on an outer periphery of a hub, freely rotatable side plates are disposed on opposite sides of said flange, holes are formed in said flange and said side plates, said flange and said side plates being elastically interconnected with each other in circumferential direction by a torsion rubber member in said holes seated on metal torsion rubber seats, claws are provided on said metal torsion rubber seats between said side plates at the inner and outer peripheral sides of said holes, said metal torsion rubber seats forming stoppers for said torsion rubber member; characterized by that said claws on said metal torsion rubber seats are bent outwardly and in the circumferential direction of said flange and said side plates away from said torsion rubber member to avoid interference between said torsion rubber member and said claws as said torsion rubber member is compressed and recessions for receiving said claws are formed on both circumferential faces of said flange hole under a free state of the disc.

2. A torsion rubber type damper disc as set forth in claim 1, in which the claws of the metal torsion rubber seats are inclined outwardly and away from said torsion rubber member; and an inner peripheral side face of the recessed portion of said flange hole is inclined to mate with the inclined claws as said torsion rubber member is compressed.

3. A torsion rubber type damper disc as set forth in claim 1, in which said outer peripheral side claw of said metal torsion rubber seats are inclined outwardly and away from said torsion rubber in such a manner that a curved surface of said claw on the disc outer peripheral side faces the hole of said flange.

4. A torsion rubber type damper disc as set forth in claim 2 or claim 3, in which said torsion rubber member has a circumferential hole in its central part and said metal torsion rubber seats have in their centers cylindrical projections fitting into said holes, whereby said torsion rubber member is positioned in relation to said seats.

5. A torsion rubber type damper disc as set forth in claim 4, in which said hub is provided on its inner peripheral surface with a spline fitting onto an output shaft and integrally has a disc-like flange on its outer peripheral surface, annular friction members are disposed on opposite peripheral sides of said flange, said rotatable side plates are disposed on opposite sides of said flange to hold said friction members, outer peripheral parts of said side plates are integrally connected with each other by stop pins, an inner peripheral part of a cushioning plate is fixed to an outer peripheral part of one side plate of said side plates, and said annular friction members are fastened to opposite surfaces of said cushioning plate.

* * * * *